INVENTORS:
HORST RIEMER
WALTER HÜBNER
GÜNTER MYSKA

Sept. 20, 1966   W. HÜBNER ETAL   3,273,435
APPARATUS FOR CROSS-CUTTING ELONGATED WEBS OF FABRIC
Filed Aug. 26, 1963   7 Sheets-Sheet 2

Fig.3

INVENTORS:
HORST RIEMER
WALTER HÜBNER
GÜNTER MYSKA

BY Karl J. Ross
AGENT

Sept. 20, 1966  W. HÜBNER ETAL  3,273,435
APPARATUS FOR CROSS-CUTTING ELONGATED WEBS OF FABRIC
Filed Aug. 26, 1963  7 Sheets-Sheet 3

INVENTORS:
HORST RIEMER
WALTER HÜBNER
GÜNTER MYSKA

BY Karl J. Ross
AGENT

Fig. 5

INVENTORS:
HORST RIEMER
WALTER HÜBNER
GÜNTER MYSKA

BY Karl F. Ross
AGENT

Sept. 20, 1966  W. HÜBNER ETAL  3,273,435
APPARATUS FOR CROSS-CUTTING ELONGATED WEBS OF FABRIC
Filed Aug. 26, 1963  7 Sheets-Sheet 6

INVENTOR
HORST RIEMER
WALTER HÜBNER
GÜNTER MYSKA

BY Karl F. Ross
AGENT

Fig.12

United States Patent Office 3,273,435
Patented Sept. 20, 1966

3,273,435
APPARATUS FOR CROSS-CUTTING ELONGATED WEBS OF FABRIC
Walter Hübner, Kunseberk uber Bielefeld, Günter Myska, Bielefeld, and Horst Riemer, Berlin, Germany, assignors to Durkoppwerke Aktiengesellschaft, Bielefeld, Germany, a corporation of Germany
Filed Aug. 26, 1963, Ser. No. 307,761
Claims priority, application Germany, Aug. 31, 1962, D 39,738
14 Claims. (Cl. 83—210)

Our present invention relates to a system for cutting elongated webs of woven or mesh-type fabric along transverse lines, e.g. in the production of towels or other piece goods of predetermined length.

The general object of our invention is to provide a method of and an apparatus for cross-cutting webs of fabric, e.g. as directly obtained from a loom, in such manner as to insure a precise severing of the fabric along transverse lines without the need for laborious manual marking or measuring.

This object is realized, in accordance with the present invention, by the steps of (a) forming transverse gaps at predetermined intervals across the web to be cut, (b) arresting the oncoming web by the insertion of suitable detents, specifically a row of feeler members, into the gap, and (c) severing the web at the gap in the vicinity of the feeler members.

In order to carry out the above process automatically, we provide—according to another aspect of this invention—an apparatus having feed means for continuously advancing a web of fabric along a track across a row of feeler members which form part of a sensing device for detecting the aforementioned gap, the feeler members thereupon penetrating the gap and halting the advance of the web, in a position of exact alignment with its track, while a testing device responsive to such penetration arrests the feed means and actuates a cutter to sever the web whereupon the advance of the web is resumed. The transverse gaps are conveniently provided in the fabric structure by the omission of one or more weft threads in the case of woven material or by the formation of a so-called open row in the case of meshed goods. The gaps, accordingly, will generally not be continuous but will be traversed by the warp threads in the fabric, the feeler members being of course so dimensioned as to be able to enter between these warp threads.

In order to insure rapidity and reliability of operation, a more specific aspect of our invention resides in the provision of practically inertia-free photoelectric means for controlling the advance of the web and the operation of the cutter, preferably in combination with a transistorized switching circuit composed of plug-in-type elements.

The invention will be described hereafter in greater detail with reference to the accompanying drawing in which.

Figure 1:
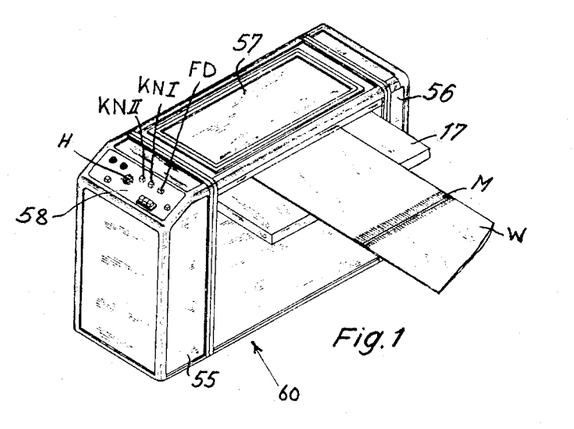
FIG. 1 is a perspective view of a fabric-cutting apparatus according to the invention as seen from the web-inlet side.
Figure 2:
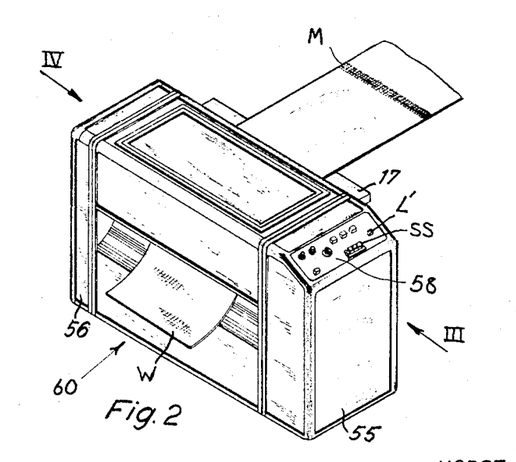
FIG. 2 is a perspective view similar to FIG. 1 as seen from the outlet side.
Figure 3:
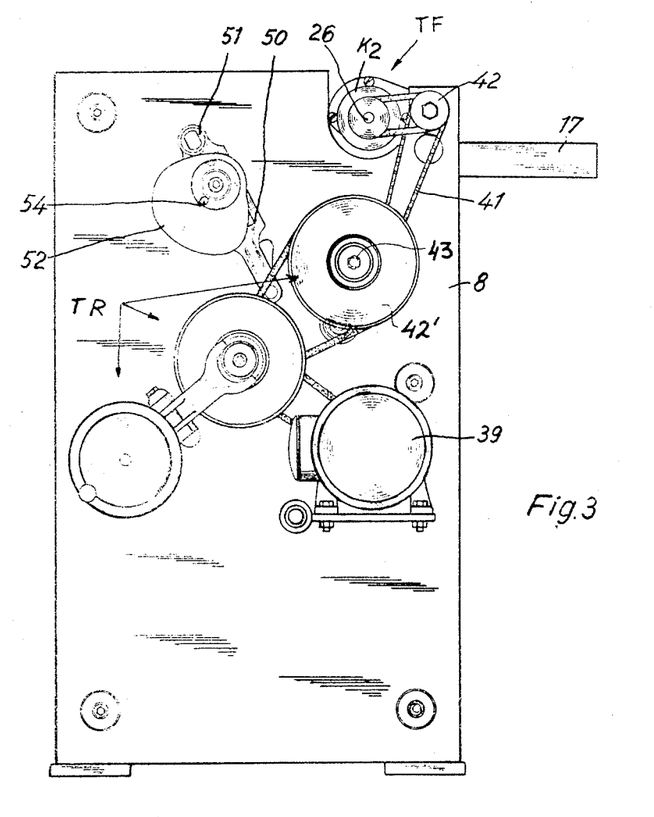
FIG. 3 is a side-elevational view taken in the direction of arrow III of FIG. 2, with the machine housing removed.

The machine visible in its totality in FIGS. 1 and 2, and illustrated in detail in FIGS. 3–11, comprises a cutter assembly (FIGS. 5 and 6) including a horizontal roller 2 with a helicoidally extending peripheral rib 2a carrying a similarly shaped knife blade 1. The latter co-operates with a stationary blade 3 whose cutting edge is closely spaced from the cylindrical orbit of blade 1. The counterknife 3 is fastened by screws 10 to a holder 11 which in turn is horizontally adjustable, with the aid of screws 11a (only one shown), on a pair of brackets 12 respectively secured to two internal walls 8, 9 (FIGS. 3, 4, 6) of the machine housing 60 (FIGS. 1 and 2). The brackets 12 (FIG. 6), whose elevation is variable with the aid of screws 13 bearing upon fixed lugs 13a on walls 8, 9, are provided with slots 12a traversed by screws 12b to enable their vertical adjustment, the two modes of adjustment permitting compensation for wear of the blade edges.

Figure 4:
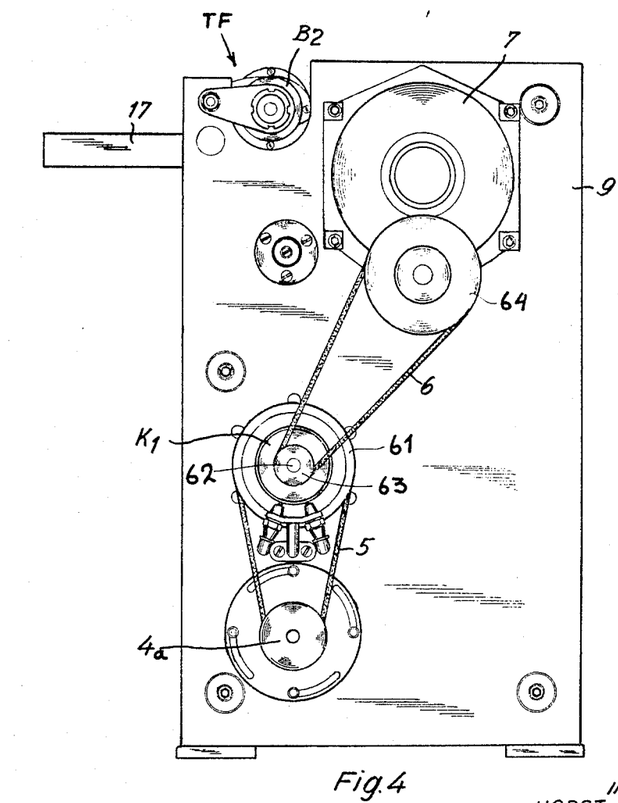
FIG. 4 is a side-elevational view similar to FIG. 3 but taken in the direction of arrow IV of FIG. 2.

Roller 2 has a shaft 53, journaled in walls 8 and 9, which can be set in intermittent rotation by a continuously operating electric motor 4 whose pulley 4a is connected via a V-belt 5 with a pulley 61 freely rotatable on a shaft 62 (FIG. 4). Shaft 62, together with a pulley 63 keyed thereto, also carries parts of an electromagnetic clutch $K_1$ and an electromagnetic brake $B_1$ by which it may be either coupled with pulley 61 for joint rotation or held stationary. Pulley 63 is connected by way of a further V-belt 6 with a pulley 64 which drives the roller shaft 53 through the intermediary of a flat frictional transmission 7.

Figure 5:
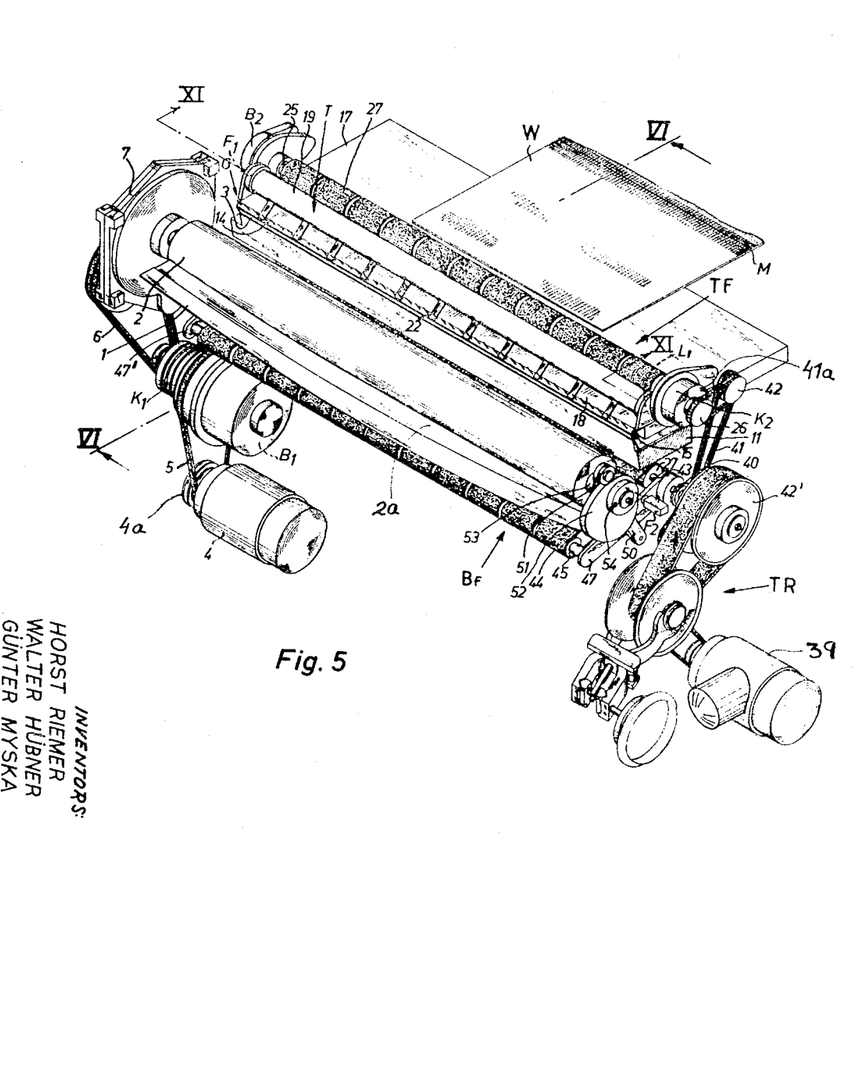
FIG. 5 is a perspective view of the mechanical parts of the machine whose housing and internal supports have been omitted for clarity.

A web of fabric W, fed into the machine housing 60 by the inlet visible in FIG. 1, travels along a generally horizontal track atop a table 17 past a guiding device G (FIG. 5). This device includes a plurality of upstanding feeler members or pins 14 (see also FIG. 6) which project from a bar 15 in a comb-like array and are normally overlain (dot-dash lines) by the web W as the latter passes from the surface of table 17 to the underside of roller 2. Table 17 is supported along its sides by a pair of arms 16 (only one shown, FIG. 6) which rest on rails 16a projecting from the walls 8 and 9, the position of arms 16 and table 17 being preferably adjustable horizontally as well as vertically in a manner not further illustrated. Bar 15 spans the arms 16 which are also bridged by a sheet-metal plate 18 extending rearwardly from bar 15 as a continuation of the surface of table 17, this plate 18 having a sloping front end engaging the bar 15 between the feelers 14 thereof.

The web W is formed at predetermined locations with transverse gaps, of which one has been illustrated at M in FIGS. 1, 2 and 5, made in the aforedescribed manner (e.g. by omission of one or more web threads) in the structure of the fabric. The pins 14 are so disposed as to pass between the warp threads of the fabric and to project through the gap M when the latter occupies a position immediately adjacent the edge of knife blade 3, as illustrated in full lines in FIG. 6.

Figure 6:
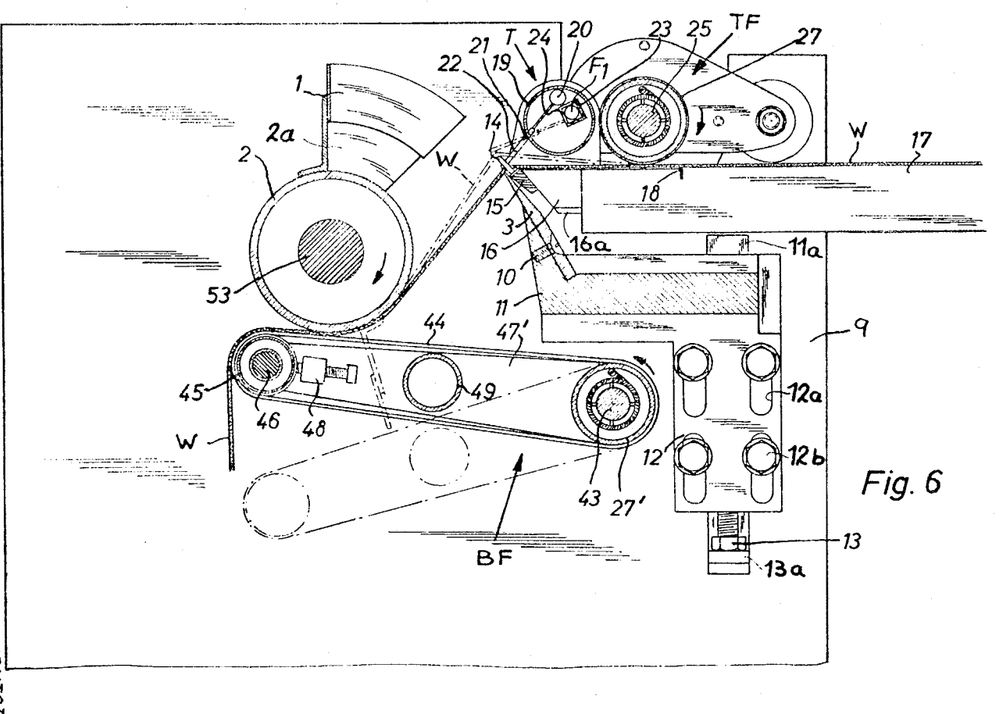
FIG. 6 is a cross-sectional view taken substantially on the line VI—VI of FIG. 5 but showing, in addition, one of the internal supporting walls of the machine housing.
Figure 7:
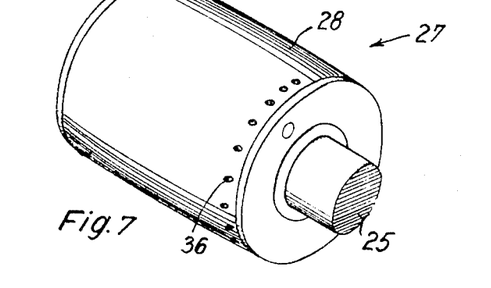
FIG. 7 is a perspective view of a traction roller forming part of the feed means of the machine shown in FIGS. 1–6.
Figure 8:
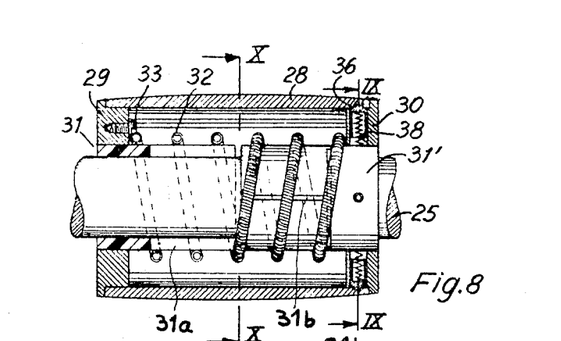
FIG. 8 is an axial sectional view of the roller shown in FIG. 7.
Figure 9:
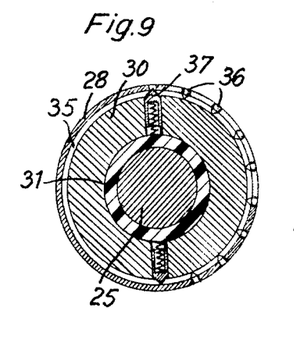
FIGS. 9 and 10 are cross-sectional views taken on the lines IX—IX and X—X, respectively, of FIG. 8.
Figure 10:
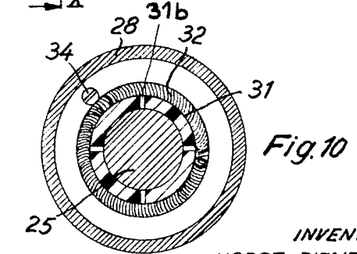
Figure 11:
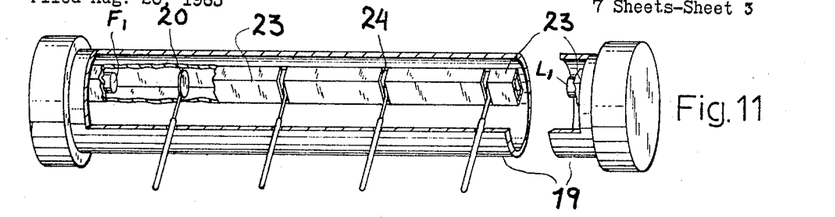
FIG. 11 is a perspective view (parts broken away) of a photoelectric testing device incorporated in the machine, taken substantially on the line XI—XI of FIG. 5.

A testing device T (FIGS. 5, 6) co-operates with the comb-like array 14, 15 to generate a signal indicative of the arrival of the gap M at the edge of blade 3. This device includes an outer tube 19, extending horizontally across the plate 18 above the path of the web W, which has pivotally secured to it a series of test fingers 22 swingable about a horizontal axis 21. The test fingers 22, normally occupying the position illustrated in full lines in FIG. 6, are less numerous than the pins 14 and have their front ends interleaved with these pins so as to fall into the spaces between the latter when the web W drops from its elevated position (dot-dash lines, FIG. 6) into the off-normal position (full lines) in which its advance is halted by the engagement of the pins with the first weft thread or row of loops present behind the gap M. The rear extremities of the fingers 22 carry small disks 20 (see also FIG. 11) which act as light stops for a photoelectric device comprising an inner tube 23 within tube 19, tube 23 forming a shielded path for light rays emitted by a lamp $L_1$ at one end of this tube toward a photocell $F_1$ at the other end. Tube 23 is provided with a series of peripheral slots 24 accommodating the disks 20 in a position blocking the passing of the light rays from lamp $L_1$ to cell $F_1$; this cell, accordingly, will be illuminated only when all the disks 20 have been withdrawn from tube 23 as the suitably weighted or spring-loaded fingers 22 swing from their dot-dash position (FIG. 6) to that shown in full lines upon penetration of a gap M by the pins 14. It will be evident that this action will take place only after the web W has become accurately aligned with its track, i.e. upon exact registry of the gap M with the row of pins 14.

The advance of the web W past the blade 3 is effected by a dual driving mechanism including a top feeder TF and a bottom feeder BF. The top feeder TF, which in accordance with this invention is temporarily deactivated upon the approach of a gap to the pins 14, comprises a shaft 25 connected at one end with an electromagnetic brake $B_2$ and at the other end with an electromagnetic clutch $K_2$ serving to couple it to a driven disk 26. This disk is continuously rotated by an electric motor 39 via an adjustable transmission TR whose output pulley 42' is keyed to a shaft 43 also carrying a sprocket 40; the latter drives the disk 26 via a further sprocket 42 and a pair of chains 41, 41a. Shaft 25 supports a series of axially adjoining traction rollers 27 whose construction is best apparent from FIGS. 7–10. Each roller 27 comprises an advantageously rubber-coated sleeve 28 spanning a pair of end flangers 29, 30. Two nylon bushings 31, 31' surround the shaft 25 in the vicinity of flanges 29, 30, respectively, these bushings being formed along part of their length with longitudinal slits 31a, 31b and being enveloped by a helical spring 32 anchored to the flanges 29 and 30 at 33 and 34. Flange 30 is manually rotatable, relatively to sleeve 28 and flange 29 rigid therewith, and is provided with indexing means in the form of spring-loaded pins 37 movable in radial bores 38 of this flange; the tips of the pins 37 are received in an annular groove 35 of sleeve 28 and are selectively receivable in radial bores 36 communicating therewith.

The bottom feeder BF, best illustrated in FIG. 6, comprises a pair of arms 47, 47' (see also FIG. 5) swingable about the shaft 43; the front ends of arms 47, 47', remote from the shaft 43, are bridged by a rod 46 rotatably supporting a set of idler rollers 45. Shaft 43 also carries a set of traction rollers 27' which are of the same construction as the rollers 27 described in connection with FIGS. 7–10; a multiplicity of friction belts 44 embrace respective traction rollers 27' and idler rollers 45 normally contacting the underside of knife roller 2. Rod 46 is limitedly displaceable along arms 47, 47' with the aid of a pair of tension adjusters 48 (only one shown, FIG. 6) which include screws bearing upon the rod beyond the idler rollers 45, thereby permitting the slack in the belts 44 to be varied. A tubular brace 49 further interconnects the arms 47, 47' at an intermediate location thereof.

The arm 47, FIG. 5, is articulated to a link 50 which carries a small roller 51 at its other end. Roller 51 acts as a cam follower for a cam disk 52 which is fixed to the knife shaft 53. In the normal position of this knife shaft, in which the blade 1 occupies the starting position illustrated in FIG. 6, cam 52 draws the link 50 upwardly so that the bottom feeder BF occupies the position shown in full lines in FIG. 6; upon rotation of shaft 33 and roller 2, the assembly swingable about shaft 43 drops under its own weight so that the traction belts 44 move out of the orbit of the rotaing blade.

Anoher photoelectric assembly includes a fixed photocell $F_2$ (FIGS. 5 and 12), a light source $L_2$ (FIG. 12) and a mirror 54 (FIG. 5) on disk 52, this mirror serving to reflect light from lamp $L_2$ onto cell $F_2$ in the normal position of shaft 53 only.

Figure 12:
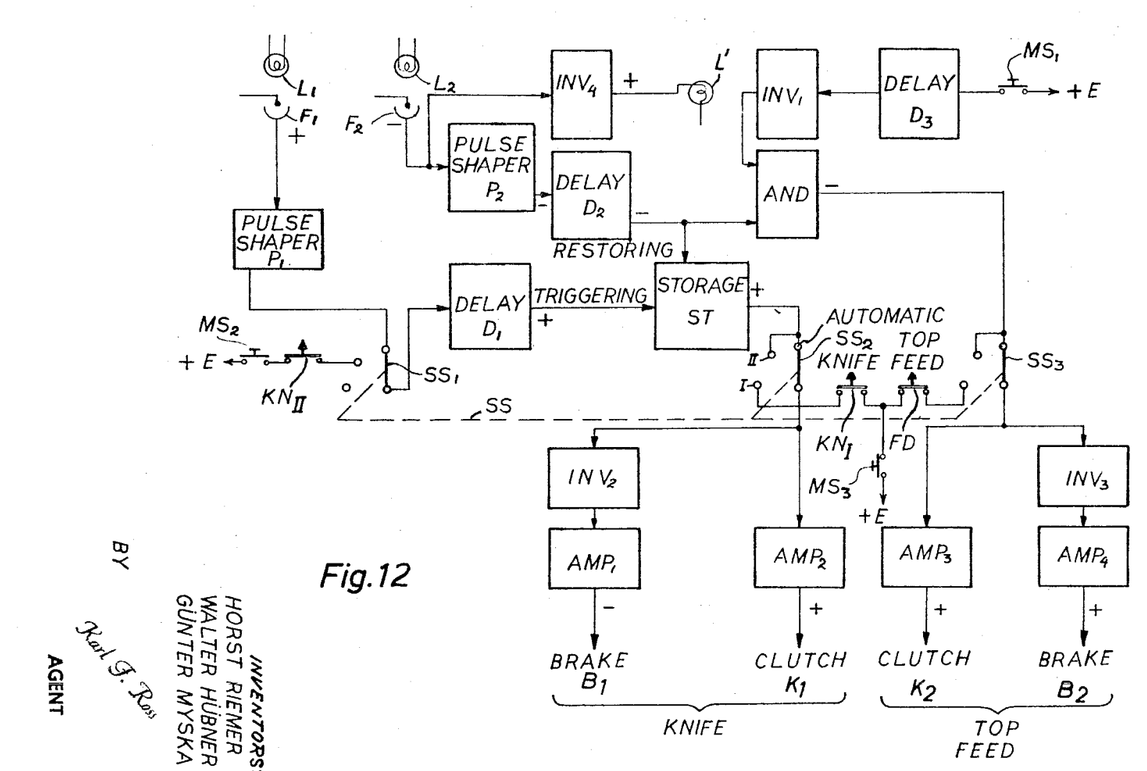
FIG. 12 is a block diagram for the switching circuit associated with the machine of FIGS. 1–11.

The housing 60, FIGS. 1 and 2, has a pair of lateral compartments 55, 56 beyond internal walls 8 and 9, respectively, at least the compartment 55 being detachable and containing the electrical components of the system. These components, more fully described hereinafter with reference to FIG. 12, are advantageously of the plug-in type and are controlled from a panel 58 bearing, inter alia, a master switch MS, a selector switch SS, a feed-control switch FD and a pair of knife-control switches $KN_I$ and $KN_{II}$:

In the circuit diagram of FIG. 12, in which the high-voltage terminal of a source of direct current has been schematically indicated at +E, the symbols "+" and "−" have been used to denote a "GO" and a "NO GO" signal, respectively, without regard to the actual polarity of the current applied; the particular condition illustrated corresponds to the situation shown in FIG. 6, i.e. the instant when the web W has dropped down onto plate 18 and the arms 22 have swung the disks 20 out of tube 23 to unblock the light path to photocell $F_1$. This cell thus applies a "+" signal to a first pulse shaper $P_1$, which may be a transistorized Schmitt-trigger circuit of the type described in "A Handbook of Selected Semi-conductor Circuits," NObsr 73231, Bureau of Ships, whereby a sharply defined output pulse of like character is delivered, via contacts $SS_1$ of selector switch SS, to a delay device $D_1$ and thence to a storage circuit ST. The output of circuit ST remains at "+" until its reversal by a signal from another delay device $D_2$, the latter being energized by a pulse shaper $P_2$ (similar to circuit element $P_1$) controlled in turn by the photocell $F_2$ which at this instant carries a "−" signal. The output of delay circuit $D_2$ is further applied to an AND circuit whose second input normally obtains a "+" signal from source E via contacts $MS_1$ of master switch MS, a delay device $D_3$ and an inverter $INV_1$ (e.g. a single-stage D.-C. amplifier). The storage circuit ST controls, via contacts $SS_2$ of selector switch 55 (when the latter is set in its position "AUTOMATIC" or one of its two manual positions, designated "HAND II"), the knife brake $B_1$ by way of an inverter $INV_2$ in series with an amplifier $AMP_1$ and the knife clutch $K_1$ by way of an amplifier $AMP_2$. The AND circuit controls, via contacts $SS_3$, the feed clutch $K_2$ via an amplifier $AMP_3$ and the feed brake $B_2$ via an inverter $INV_3$ and an amplifier $AMP_4$. The output of photocell $F_2$ also reaches, though an inverter $INV_4$, an alarm lamp L' on the control panel 58 (FIG. 2).

The apparatus described above operates as follows:

Under the circumstances indicated in FIG. 12, i.e. with the knife blade 1 about to start its rotation from the position illustrated in FIG. 6, the web W has come to rest on the table 17 with its extension 18 but its front portion is still under tension from the traction of the circulating belts 44. The web portion slanting downwardly from the pins 14 to the underside of roller 2 is thus stretched taut and the fingers 22 lift the stops 20 out of the tube 23 so that photocell $F_1$ will give the "+" signal shown in FIG. 12. With selector switch SS in its "AUTOMATIC" position, pulse shaper $P_1$ and delay circuit $D_1$ produce a "+" signal which triggers the storage device ST into its "+" position for a period independent of the duration of energization of cell $F_1$. Clutch $K_1$ is thus energized while brake $B_1$ is deactivated by the inverted or "−" signal applied to it from amplifier $AMP_1$.

Shaft 55 is thus rotated clockwise (FIG. 6) and causes the blade 1, in co-operation with blade 3, to sever the web W at the gap M penetrated by the pins 14. At the same time, the assembly BF is swung down into the lowered position (dot-dash lines, FIG. 6) in which its belts 44 clear the orbiting knife 1. The severed web portion then slides off the moving belts 44 of feeder BF into a waiting receptacle not shown.

As soon as the shaft 53 reaches its normal position, the illumination of photocell $F_2$ by way of reflector 54 (FIG. 5) ceases and alarm lamp L' is energized via inverter $INV_4$. When the cutter 1, 2, 53 returns to its starting position, cell $F_2$ is again lit and pulse shaper $P_2$ produces a "+" signal which restores the circuit ST to its quenched state and its output drops to zero or some other value constituting a "−" signal. This condition deactivates the clutch $K_1$ and reoperates the brake $B_1$ to arrest the rotation of blade 1, the bottom feeder BF having meanwhile returned to its normal position adjacent the roller 2. The "+" signal from circuit $D_2$, suitably lengthened by that circuit, acts upon the AND circuit to reverse the signals applied to brake $B_2$ and clutch $K_2$, thereby restarting the top feeder TF. The duration of this signal as passed by circuit $D_2$ is such as to maintain the feeder TF operated until the next gap M approaches the knife 3, it being thus apparent that the starting and stopping of this feeder is controlled by the test device T in response to penetration of the preceding gap by the pins 14.

As the web W is again advanced by the feed rollers 27 past the cutting point above plate 3, it rises above the pins 14 and drops with its front edge onto the belts 44 for renewed entrainment past the roller 2. As the next gap nears the pins 14, top feeder TF is halted by the disappearance of the "+" signal from the output of timer $D_2$ (as heretofore described) and the advance of the web W is thereupon continued solely under the action of bottom feeder BF. When the pins 14 penetrate the next gap, the cycle is repeated.

When power is connected to the system through the closure of master switch MS, without a web W overlying the pins 14 so that the fingers 22 unblock the light path to photocell $F_1$, the resulting electrical pulse could produce a "+" signal starting the timer $D_2$ for an interval unrelated to the position of the first gap M on the web next fed into the inlet slot of housing 60. In order to prevent any malfunctioning of the apparatus under these circumstances, delay circuit $D_3$ is connected to the second input of the AND circuit so that a counteracting pulse, due to the closure of the switch contacts $MS_1$, results in the application of a "−" signal to the AND circuit for a period determined by the timer $D_3$, the latter having an effective interval greater than that of timer $D_2$.

When the switch SS is placed in its manual position "HAND II" the operation is the same as in the "AUTOMATIC" position except that the knife-control circuit $B_1$, $K_1$ is now actuated manually, through pushbutton switch $KN_{II}$ in series with contacts $MS_2$ of master switch MS, rather than by the output of photocell $F_1$. Again, the knife 1 will make a single revolution before being arrested under the control of photocell $F_2$. In position "HAND I" the operation is entirely manual and the knife and feed drives are selectedly operated with the aid of pushbutton switches $KN_I$ and FD.

The arrangement described and illustrated is, of course, not limited to the specific details of construction hereinabove disclosed but may be modified in various ways without departing from the spirit and scope of the invention as defined in the appended claims.

We claim:
1. An apparatus for cross-cutting an elongated web of fabric, comprising guide means forming a generally horizontal track for said web; sensing means for detecting a transverse gap in the structure of said fabric, said sensing means including a row of upstanding feeler members extending across said track and adapted to enter said gap upon said web passing thereover; test means suspended above said track for contact with said web, said test means being normally maintainable by said web in an elevated position and being arranged to descend into an off-normal position upon a lowering of said web with penetration of said gap by said feeler members; feed means for advancing said web across said row; normally inoperative cutter means for severing said web adjacent said row; and mechanism responsive to a lowering of said test means into said off-normal position for arresting said feed means, actuating said cutter means and thereupon restarting said feed means.

2. An apparatus as defined in claim 1 wherein said feed means comprises roller means above said track and a driven shaft supporting said roller means, the latter being frictionally entrainable by said shaft.

3. An apparatus as defined in claim 2 wherein said roller means includes a plurality of juxtaposed traction rollers independently rotatable on said shaft, each of said rollers being provided with means for adjusting its frictional engagement with said shaft.

4. An apparatus for cross-cutting an elongated web of fabric, comprising guide means forming a generally horizontal track for said web; sensing means for detecting a transverse gap in the structure of said fabric, said sensing means including a row of upstanding feeler members extending across said track and adapted to enter said gap upon said web passing thereover; test means suspended above said track for contact with said web, said test means being normally maintainable by said web in an elevated position and being arranged to descend into an off-normal position upon a lowering of said web with penetration of said gap by said feeler members; first feed means ahead of said row for advancing said web across said row; normally inoperative cutter means for severing said web adjacent said row; second feed means beyond said row engageable with said web for the removal of severed sections thereof; and mechanism responsive to a lowering of said test means into said off-normal position for arresting said first feed means, actuating said cutter means and thereupon restarting said first feed means.

5. An apparatus for cross-cutting an elongated web of fabric, comprising guide means forming a generally horizontal track for said web; sensing means for detecting a transverse gap in the structure of said fabric, said sensing means including a row of upstanding feeler members extending across said track and adapted to enter said gap upon said web passing thereover; a series of test fingers suspended above said track between said feeler members for contact with said web, said test fingers being normally maintainable by said web in an elevated position and being arranged to descend into an off-normal position upon a lowering of said web with penetration of said gap by said feeler members; feed means for advancing said web across said row; normally in operative cutter means for severing said web adjacent said row; and mechanism responsive to a lowering of all said test fingers into said off-normal position for arresting said feed means, actuating said cutter means and thereupon restarting said feed means.

6. An apparatus as defined in claim 5 wherein said mechanism includes a shielded light path, a source of light and photosensitive means at opposite ends of said path, a plurality of light stops respectively connected with said test fingers for interposition in said path in the elevated position thereof whereby said photosensitive means is illuminated only upon descent of all said test fingers into said off-normal position, and circuit means responsive to said photosensitive means for controlling said cutter and feed means.

7. An apparatus for cross-cutting an elongated web of fabric, comprising guide means forming a generally horizontal track for said web; sensing means for detecting a transverse gap in the structure of said fabric, said sensing means including a row of upstanding feeler members extending across said track and adapted to enter said gap upon said web passing thereover; a series of test fingers suspended above said track between said feeler members for contact with said web, said test fingers being normally maintainable by said web in an elevated position and being arranged to descend into an off-normal position upon a lowering of said web with penetration of said gap by said feeler members; first feed means ahead of said row for advancing said web across said row; normally inoperative cutter means for severing said web adjacent said row; second feed means beyond said row engageable with said web for the removal of severed sections thereof; and mechanism responsive to a lowering of all said test fingers into said off-normal position for arresting said first feed means, actuating said cutter means and thereupon restarting said first feed means.

8. An apparatus as defined in claim 7 wherein said cutter means comprises a rotatable blade having an orbit just beyond said row of feeler members, said second feed means being disposed below said blade.

9. An apparatus as defined in claim 8 wherein said cutter means includes a horizontal roller carrying said blade on its periphery, said second feed means comprising conveyor means normally bearing from below against said periphery and displaceable support means for said conveyor means coupled with said cutter means for moving said conveyor means out of said orbit during rotation of said blade.

10. An apparatus as defined in claim 8 wherein said mechanism comprises a shielded light path, first photoelectric means including a source of light and photosensitive means at opposite ends of said path, a plurality of light stops respectively connected with said test fingers for interposition in said path in the elevated position thereof whereby said photosensitive means is illuminated only upon descent of all said test fingers into said off-normal position, second photoelectric means coupled with said cutter means for actuation in a predetermined starting position of said blade only, first circuit means responsive to said first photoelectric means for rotating said blade upon penetration of said gap by said feeler members, and second circuit means responsive to said second photoelectric means for stopping said blade and operating said first feed means upon return of said blade to said starting position, said second circuit means including timer means for terminating the operation of said first feed means upon the approach of a further gap to said feeler members.

11. An apparatus as defined in claim 10 wherein said cutter means includes a horizontal roller carrying said blade on its periphery; said second feed means comprising conveyor means normally bearing from below against said periphery, displaceable support means for said conveyor means, and rotatable cam means coupled with said roller, said cam means coacting with said support means for moving said conveyor means out of said orbit during rotation of said blade.

12. A device as defined in claim 11 wherein said second photoelectric means includes an optical reflector carried by said cam means, and further photosensitive means illuminable via said reflector in said starting position.

13. An apparatus as defined in claim 10 wherein said shielded light path comprises a tube extending across said track above said row, said tube having a plurality of peripheral slots accommodating said light stops at their ends remote from said feeler members.

14. An apparatus as defined in claim 10 wherein said guide means forms part of a machine housing surrounding said track, said housing being provided with a detachable compartment containing said first and second circuit means.

References Cited by the Examiner

UNITED STATES PATENTS

| | | | |
|---|---|---|---|
| 1,090,388 | 3/1914 | Foote | 83—371 |
| 1,759,344 | 5/1930 | Chessman | 83—371 |
| 2,170,609 | 8/1939 | Nedal | 83—371 |
| 2,966,086 | 12/1960 | Sjostrom | 83—365 X |
| 3,182,536 | 5/1965 | Sumpter et al. | 83—210 X |

WILLIAM S. LAWSON, *Primary Examiner.*